(12) United States Patent
Tsunashima et al.

(10) Patent No.: US 10,241,605 B2
(45) Date of Patent: Mar. 26, 2019

(54) LIQUID CRYSTAL DISPLAY DEVICE

(71) Applicant: Japan Display Inc., Minato-ku (JP)

(72) Inventors: Takanori Tsunashima, Tokyo (JP);
Takashi Nakamura, Tokyo (JP);
Masahiro Tada, Tokyo (JP); Kazuhide Mochizuki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 46 days.

(21) Appl. No.: 15/434,559

(22) Filed: Feb. 16, 2017

(65) Prior Publication Data
US 2017/0235399 A1   Aug. 17, 2017

(30) Foreign Application Priority Data
Feb. 17, 2016   (JP) .................. 2016-027725

(51) Int. Cl.
| G06F 3/041 | (2006.01) |
| G02F 1/1335 | (2006.01) |
| G02F 1/1343 | (2006.01) |
| G02F 1/1362 | (2006.01) |
| G02F 1/1368 | (2006.01) |
| G06F 3/044 | (2006.01) |
| G09G 3/36 | (2006.01) |
| G02F 1/1333 | (2006.01) |

(52) U.S. Cl.
CPC .......... *G06F 3/0412* (2013.01); *G02F 1/1368* (2013.01); *G02F 1/133512* (2013.01); *G02F 1/133514* (2013.01); *G02F 1/134336* (2013.01); *G02F 1/136286* (2013.01); *G06F 3/044* (2013.01); *G06F 3/0416* (2013.01); *G09G 3/3614* (2013.01); *G09G 3/3648* (2013.01); *G02F 1/13338* (2013.01); *G02F 1/13624* (2013.01); *G02F 1/136209* (2013.01); *G02F 2001/13685* (2013.01); *G02F 2201/121* (2013.01); *G02F 2201/123* (2013.01); *G06F 2203/04107* (2013.01); *G09G 2354/00* (2013.01)

(58) Field of Classification Search
None
See application file for complete search history.

(56) References Cited

U.S. PATENT DOCUMENTS

| 2014/0347584 A1 | 11/2014 | Kitani | |
| 2015/0346860 A1* | 12/2015 | Qin | G06F 3/0412 345/174 |
| 2016/0133198 A1* | 5/2016 | Jeong | G02F 1/133502 345/212 |

FOREIGN PATENT DOCUMENTS

JP   2014-228834   12/2014

* cited by examiner

*Primary Examiner* — Joseph R Haley
(74) *Attorney, Agent, or Firm* — Oblon, McClelland, Maier & Neustadt, L.L.P.

(57) ABSTRACT

According to one embodiment, a liquid crystal display device includes touch-sensor electrodes, an array substrate including pixel electrodes, gate lines, source lines, switching elements, a light-shielding layer, and a plurality of stripe-like common electrodes, a counter-substrate, and a liquid crystal layer, wherein the common electrodes included in the array substrate are used not only as electrodes for display, but also as touch-sensor electrodes and, in a touch operation, a touch drive signal is input to each drive unit electrode including a plurality of common electrodes, and the light-shielding layer is divided into parts each of which corresponds to the drive unit electrode, and is provided to extend across a region opposed to a region of the drive unit electrode.

10 Claims, 11 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2016-027725, filed Feb. 17, 2016, the entire contents of which are incorporated herein by reference.

FIELD

Embodiments described herein relate generally to a liquid crystal display device.

BACKGROUND

A liquid crystal display device is incorporated in various devices including a television receiver, vehicle-mounted display such as car navigation equipment and the like, notebook-size personal computer, tablet PC, cellular telephone, and mobile terminal such as a smartphone, and the like.

An active-matrix liquid crystal display device is provided with an active area including pixels arranged in a matrix form. An active area is provided with gate lines extending along rows in which pixels are arranged, source lines extending along columns, and switching elements arranged in the vicinities of positions at which the source lines and the gate lines cross each other. Further, as a switching element of an active-matrix liquid crystal display device, a thin-film transistor (TFT) utilizing low-temperature polysilicon (LTPS) is widely used.

Incidentally, in a TFT utilizing LTPS, there is a problem that a pixel voltage is changed by a light leak thereby causing a flicker. For this reason, a liquid crystal display device provided with a TFT utilizing LTPS is configured to shade, for example, backlight by being provided with a light-shielding layer.

In recent years, in a liquid crystal display device, the trend toward higher definition and higher aperture is further enhanced, and hence the retention capacity of the individual pixel is gradually becoming smaller. Along with such a trend, the parasitic capacitance tends to increase owing to the proximity of the light-shielding layer and the source line to each other. As a result, there is a problem that the potential of the shielding-layer provided in an electrically-floating state is changed by the potential of the source line, whereby the characteristics of the TFT are changed and the display quality is lowered.

On the other hand, a liquid crystal display device with an in-cell type touch detection function in which a common electrode for display originally provided in the liquid crystal display device is used also as an electrode for a touch sensor is proposed. In this liquid crystal display device too, it is required that the lowering of the sensitivity of the touch sensor resulting from a change in the potential of the light-shielding layer be prevented from occurring.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings.

In general, according to one embodiment, a liquid crystal display device comprising: touch-sensor electrodes configured to include a plurality of electrodes; an array substrate configured to include pixel electrodes arranged in a matrix form, gate lines extending along rows in which the pixel electrodes are arranged, source lines extending along columns in which the pixel electrodes are arranged, switching elements arranged in the vicinities of positions at which the gate lines and the source lines cross each other, a light-shielding layer arranged in an underlying layer of the switching elements and extending in a direction identical to the direction in which the gate lines extend, and a plurality of stripe-like common electrodes extending in a direction identical to the direction in which the source lines extend; a counter-substrate; and a liquid crystal layer held between the array substrate and the counter-substrate, wherein the common electrodes included in the array substrate are used not only as electrodes for display, but also as touch-sensor electrodes and, in a touch operation, a touch drive signal is input to each drive unit electrode including a plurality of common electrodes, and the light-shielding layer is divided into parts each of which corresponds to the drive unit electrode, and is provided to extend across a region opposed to a region of the drive unit electrode.

Note that the disclosure is presented for the sake of exemplification, and any modification and variation conceived within the scope and spirit of the embodiments by a person having ordinary skill in the art are naturally encompassed in the scope of embodiment of the present application. Furthermore, a width, thickness, shape, and the like of each element are depicted schematically in the figures as compared to actual embodiments for the sake of simpler explanation, and they do not limit the interpretation of the present embodiments. Furthermore, in the description and Figures of the present application, structural elements having the same or similar functions will be referred to by the same reference numbers and detailed explanations of them that are considered redundant may be omitted.

First Embodiment

Figure 1:
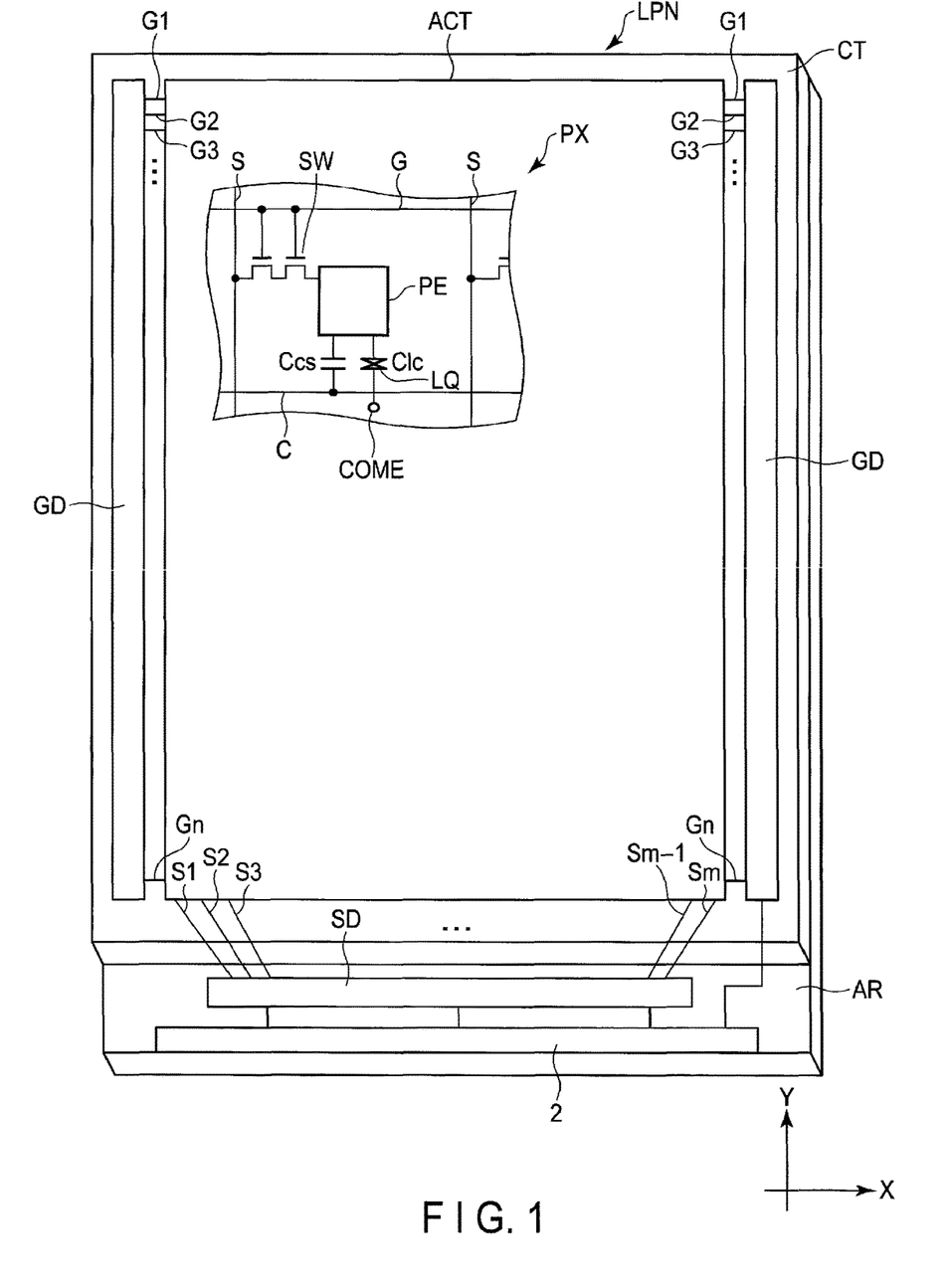
FIG. 1 is a view schematically showing a configuration example of a liquid crystal display device of a first embodiment.

FIG. 1 is a view schematically showing a configuration example of a liquid crystal display device of a first embodiment.

The liquid crystal display device of this embodiment is provided with a liquid crystal display panel LPN of the active matrix type. The liquid crystal display panel LPN is provided with an array substrate AR which is a first substrate, counter-substrate CT which is a second substrate arranged in opposition to the array substrate AR, and liquid crystal layer LQ held between the array substrate AR and the counter-substrate CT. The liquid crystal display panel LPN is provided with an active area ACT configured to display an image. The active area ACT includes a plurality of, i.e., m×n pixels PX arranged in a matrix form (here, m and n are positive integers).

The liquid crystal display panel LPN is provided with, in the active area ACT, n gate lines G (G1 to Gn), n auxiliary capacity lines C (C1 to Cn), m source lines S (S1 to Sm), and the like. The gate lines G and the auxiliary capacity lines C extend substantially linear in, for example, a first direction X. These gate lines G and the auxiliary capacity lines C are alternately arranged in parallel with each other in a second direction Y crossing the first direction. Here, the first direction X and the second direction Y are substantially perpendicular to each other. The source lines S cross the gate lines G and the auxiliary capacity lines C.

The source lines S extend substantially linear in the second direction Y. It should be noted that the gate lines G, the auxiliary capacity lines C, and the source lines S need not necessarily extend linear, and part of them may be bent.

Each of the gate lines G is drawn out of the active area ACT to thereby be connected to a gate driver GD. Each of the source lines S is drawn out of the active area ACT to thereby be connected to a source driver SD. At least part of the gate driver GD and the source driver SD are connected to, for example, a drive IC chip 2 formed on the array substrate AR and incorporating therein a controller.

Each of the pixels PX is provided with a switching element SW, pixel electrode PE, common electrode COME, and the like. It should be noted that a switching element SW in this embodiment has a double-gate structure (details thereof will be described later) for reducing a leak current. The auxiliary capacity Ccs is formed, for example, between the auxiliary capacity line C and drain wiring (semiconductor layer) of the switching element SW. The auxiliary capacity line C is electrically connected to a voltage application section (not shown) to which an auxiliary capacity voltage is applied.

It should be noted that in this embodiment, the liquid crystal panel LPN has a configuration in which the pixel electrode PE and the common electrode COME are formed on the array substrate AR, and switching of liquid crystal molecules of the liquid crystal layer LQ is carried out by mainly utilizing an electric field formed between the pixel electrode PE and the common electrode COME.

The switching element SW includes, for example, an n-channel thin-film transistor (TFT). The switching element SW is electrically connected to a gate line G and source line S. The switching element SW may be either of the top-gate type or the bottom-gate type. Further, although the semiconductor layer of the switching element SW is formed of, for example, polysilicon, the semiconductor layer may be formed of amorphous silicon.

The pixel electrode PE is arranged in each pixel PX, and is electrically connected to the switching element SW. The common electrode COME is arranged in common with pixel electrodes PE of a plurality of pixels PX through the liquid crystal layer LQ. Although the pixel electrode PE and the common electrode COME described above are formed of, for example, an electrical conducting material having optical transparency such as an indium tin oxide (ITO), indium zinc oxide (IZO), and the like, they may be formed of other metallic materials such as aluminum and the like.

The array substrate AR is provided with an electric power supply section (not shown) configured to apply a voltage to the common electrode COME. This electric power supply section is formed on, for example, the outside of the active area ACT. The common electrode COME is drawn out of the active area ACT and is electrically connected to the electric power supply section through an electrically conductive member not shown.

The liquid crystal display device of this embodiment is provided with a touch detection function. The self-detection scheme and the mutual-detection scheme which are the schemes for detecting a touch position of the liquid crystal display device of this embodiment will be described below.

<Self-Detection Scheme>

Figure 2A:
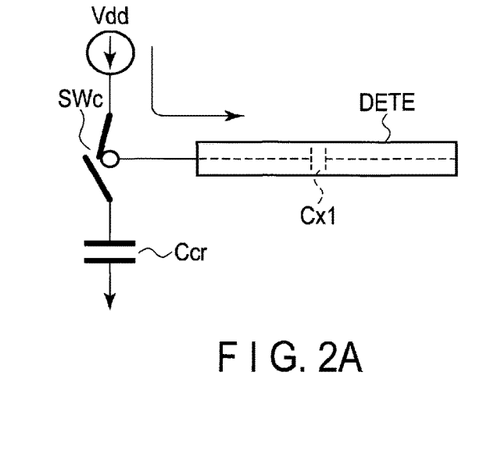
FIG. 2A is a view for explaining the principle of a self-detection scheme in the liquid crystal display device of the first embodiment.
Figure 2B:
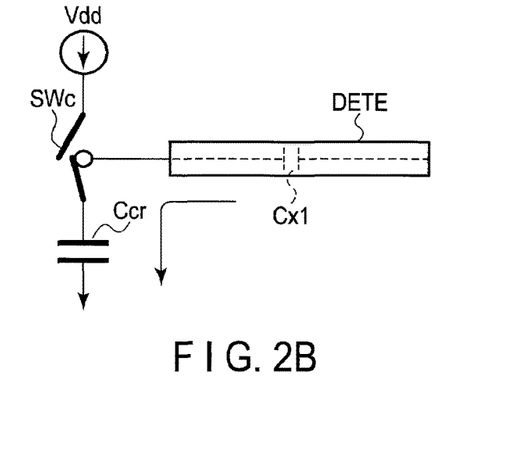
FIG. 2B is a view for explaining the principle of the self-detection scheme in the liquid crystal display device of the first embodiment.

FIG. 2A, FIG. 2B, FIG. 3A, and FIG. 3B are views for explaining the principle of the self-detection scheme in the liquid crystal display device of this embodiment. FIG. 2A and FIG. 2B each show a state where a finger of the user is not in contact with the touch panel. FIG. 2A shows a state where a power source Vdd and a detection electrode DETE are connected to each other by a control switch SWc, and the detection electrode DETE is not connected to a capacitor Ccr. In this state, the capacitance Cx1 possessed by the detection electrode DETE is charged. FIG. 2B shows a state where the connection between the power source Vdd and the detection electrode DETE is cut off by the control switch SWc, and the detection electrode DETE and the capacitor Ccr are connected to each other. In this state, the charge of the capacitance Cx1 is discharged through the capacitor Ccr.

Figure 3A:
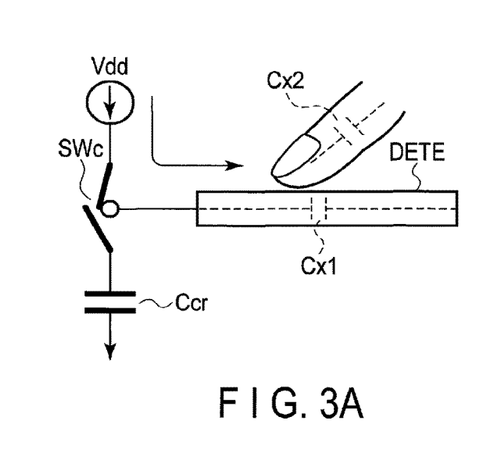
FIG. 3A is a view for explaining the principle of the self-detection scheme in the liquid crystal display device of the first embodiment.
Figure 3B:
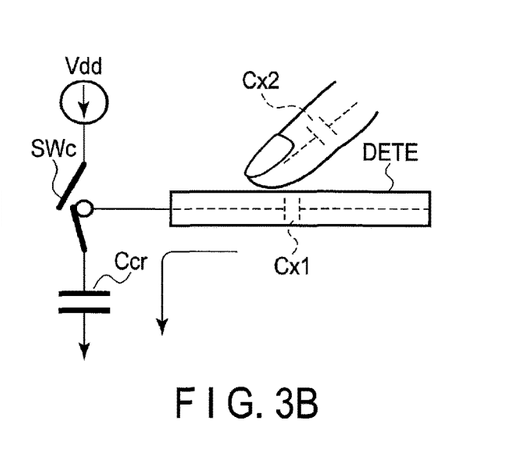
FIG. 3B is a view for explaining the principle of the self-detection scheme in the liquid crystal display device of the first embodiment.

FIG. 3A and FIG. 3B each show a state where the finger of the user is in contact with the touch panel. FIG. 3A shows a state where the power source Vdd and the detection electrode DETE are connected to each other by the control switch SWc, and the detection electrode DETE is not connected to the capacitor Ccr. In this state, not only the capacitance Cx1 possessed by the detection electrode DETE but also the capacitance Cx2 created by the finger of the user close to the detection electrode DETE are charged. FIG. 3B shows a state where the connection between the power source Vdd and the detection electrode DETE is cut off by the control switch SWc, and the detection electrode DETE and the capacitor Ccr are connected to each other. In this state, the charge of the capacitance Cx1 and the charge of the capacitance Cx2 are discharged through the capacitor Ccr.

Here, the voltage change characteristics of the capacitance Ccr at the time of discharge (state where the finger is in contact with the panel) shown in FIG. 3B is evidently different from the voltage change characteristics of the capacitance Ccr at the time of discharge (state where the finger is not in contact with the panel) shown in FIG. 2B because of the presence of the capacitance Cx2. Accordingly, in the self-detection scheme, whether operation input by the finger or the like is present or absent is determined by utilizing the fact that voltage change characteristics of the capacitance Ccr differ depending on the presence or absence of the capacitance Cx2.

<Mutual-Detection Scheme>

Figure 4:
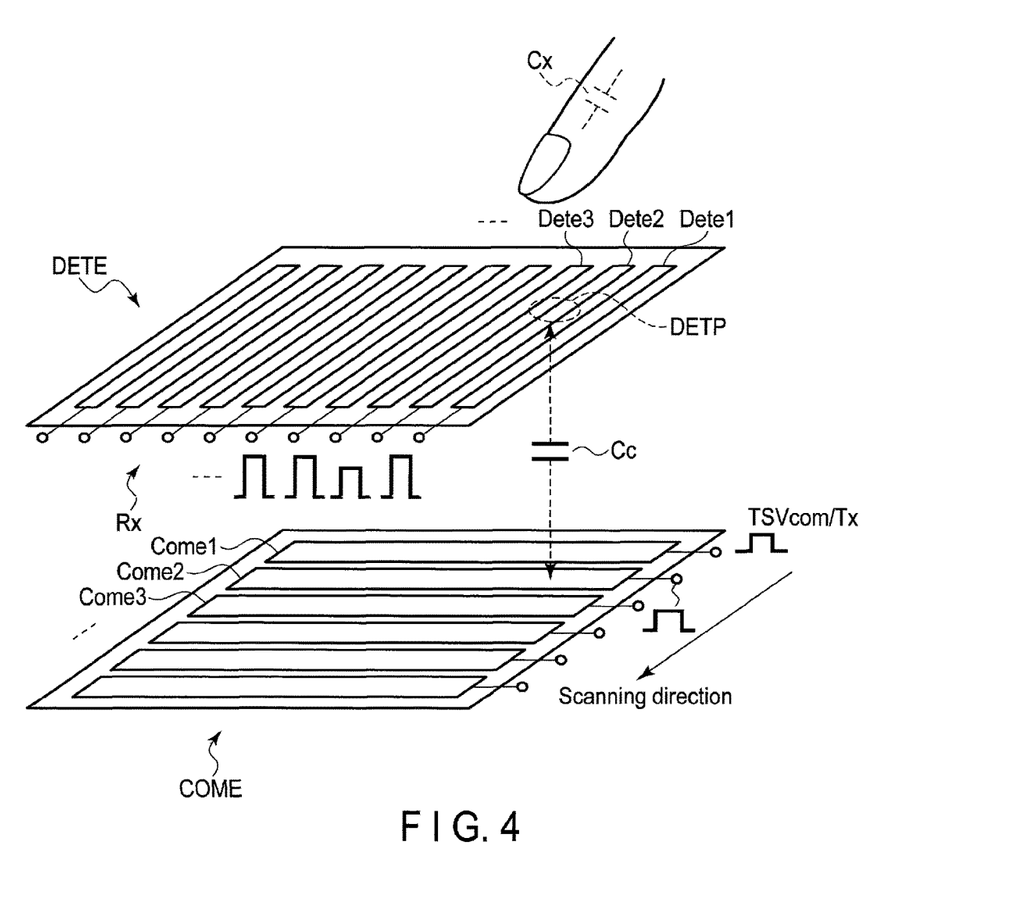
FIG. 4 is a view showing a representative basic configuration of a mutual-detection scheme of the liquid crystal display device of the first embodiment.

FIG. 4 is a view showing a representative basic configuration of a mutual-detection scheme of the liquid crystal display device of this embodiment. The common electrode COME and the detection electrode DETE are utilized. The common electrode COME includes a plurality of stripe-like common electrodes Come1, Come2, Come3, . . . . The plurality of stripe-like common electrodes Come1, Come2, Come3, . . . are arranged in the scanning (driving) direction (Y direction or X direction).

On the other hand, the detection electrode DETE includes a plurality of stripe-like detection electrodes Dete1, Dete2, Dete3, . . . (thinner than the stripe-like common electrodes). The plurality of stripe-like detection electrodes Dete1, Dete2, Dete3, . . . are arranged in a direction perpendicular to the stripe-like common electrodes Come1, Come2, Come3, . . . (X direction or Y direction).

The common electrode COME and the detection electrode DETE are arranged in a vertical direction with a gap held between them. For this reason, the capacitance Cc is basically present between the plurality of stripe-like common electrodes Come1, Come2, Come3, . . . and the plurality of stripe-like detection electrodes Dete1, Dete2, Dete3, . . . .

The plurality of stripe-like common electrodes Come1, Come2, Come3, . . . are scanned by a drive pulse Tx on a predetermined cycle. Now, it is assumed that the finger of the user is present in close proximity to the stripe-like detection electrode Dete2. Then, when the drive pulse Tx is supplied to the stripe-like common electrode Come2, from the stripe-like detection electrode Dete2, a pulse of a level lower than those obtainable from other stripe-like detection electrodes is obtained.

The capacitance Cx represented by the finger differs between a case where the finger of the user is close to the detection electrode DETE and a case where the finger is far from the detection electrode DETE. For this reason, the level of a detection pulse Rx also differs between the case where the finger of the user is close to the detection electrode DETE and the case where the finger is far from the detection electrode DETE. Accordingly, the degree of proximity of the finger to the flat surface of the touch panel can be determined by the level of the detection pulse Rx. Of course, the two-dimensional position of the finger on the flat surface of the touch panel can be detected according to the electrode drive timing of the drive pulse Tx and the output timing of the detection pulse Rx.

Figure 5A:
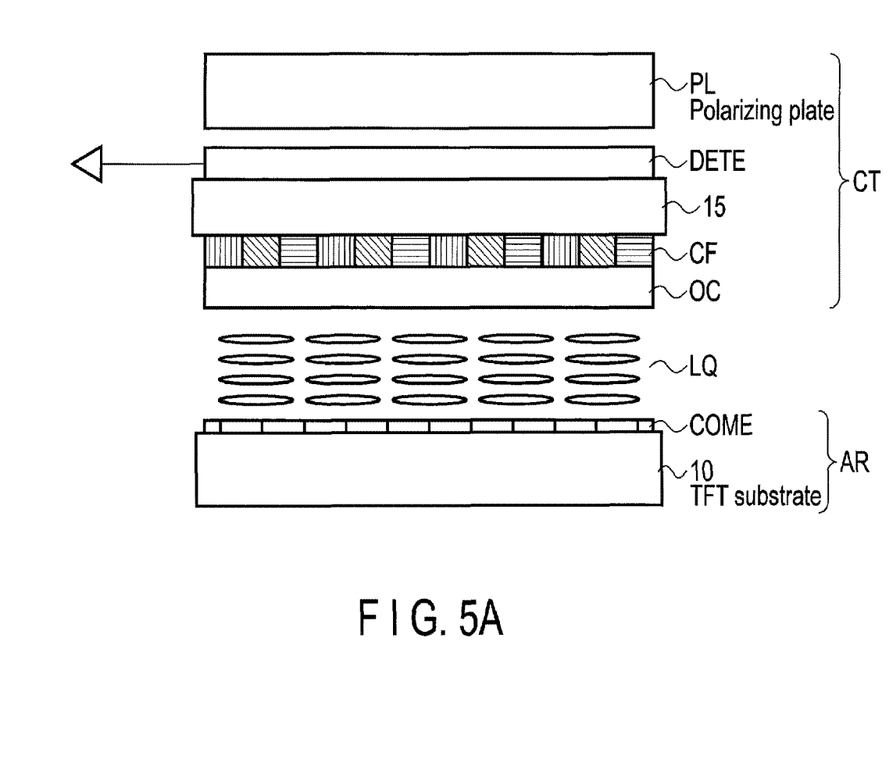
FIG. 5A is a view showing the schematic configuration of a sensor of the liquid crystal display device of the first embodiment.
Figure 5B:
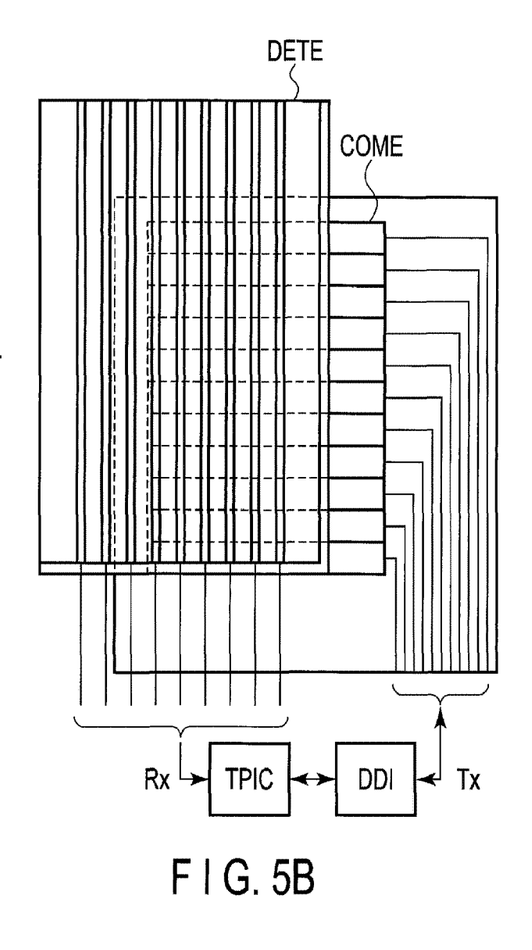
FIG. 5B is a view showing the schematic configuration of the sensor of the liquid crystal display device of the first embodiment.

FIG. 5A and FIG. 5B are views showing the schematic configuration of a sensor of the liquid crystal display device of this embodiment.

FIG. 5A shows a cross-sectional view of the liquid crystal display device, and FIG. 5B shows a plan view showing the configuration of the sensor.

As shown in FIG. 5A, the liquid crystal display device is provided with an array substrate AR, counter-substrate CT, and liquid crystal layer LQ held between the array substrate AR and the counter-substrate CT.

It should be noticed that in the following description, the aforementioned stripe-like common electrodes Come1, Come2, Come3, . . . are expressed as the common electrodes COME for simplification of description. Further, the stripe-like detection electrodes Dete1, Dete2, Dete3, . . . are expressed as the detection electrodes DETE.

The array substrate AR is provided with a TFT substrate 10, and common electrodes COME. The TFT substrate 10 is provided with a transparent insulating substrate formed of glass or the like, switching elements not shown, various types of wiring including source lines S and gate lines G and the like, and planarizing layer serving as an insulating film covering the above-mentioned members and elements. The common electrodes COME are arranged on the TFT substrate 10 and are covered with an insulating layer. The common electrodes COME are also used as sensor drive electrodes. Further, in this embodiment, the common electrodes COME extend in a direction identical to a direction in which the source lines S extend.

The counter-substrate CT is provided with a transparent insulating substrate 15 formed of glass or the like, color filter CF, detection electrodes DETE, and polarizing plate PL. The color filter CF is arranged on the transparent insulating substrate 15. The color filter CF is covered with an overcoat layer OC. The detection electrodes DETE are arranged on the principal surface on the outer side (opposite side to the color filter CF) of the transparent insulating substrate 15. The detection electrodes DETE extend in a direction (second direction) substantially perpendicular to a direction (first direction) in which the common electrodes COME extend, and are arranged like a plurality of stripes arranged in the first direction. The detection electrodes DETE are formed of a transparent electrode material such as the ITO and IZO. The polarizing plate PL is arranged on the detection electrodes DETE (opposite side to the color filter CF of the transparent insulating substrate 15).

Figure 6A:
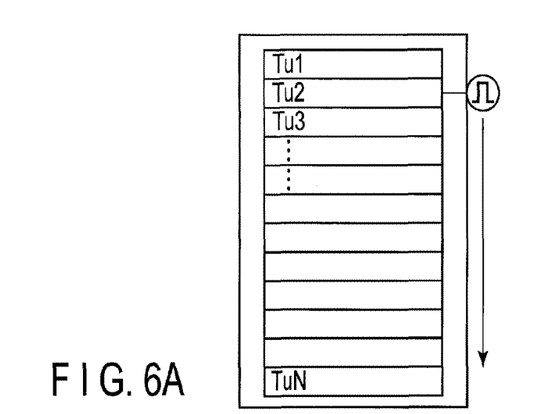
FIG. 6A is a view for explaining a driving method of the mutual-detection scheme of the liquid crystal display device of the first embodiment.
Figure 6B:
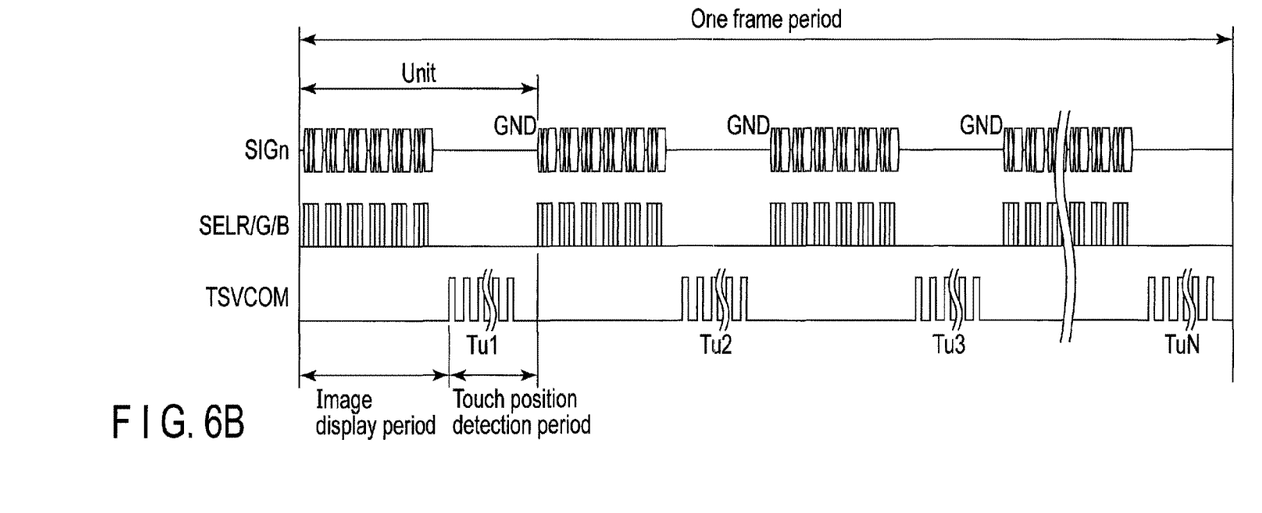
FIG. 6B is a view for explaining the driving method of the mutual-detection scheme of the liquid crystal display device of the first embodiment.

FIG. 5B is a view for explaining a configuration example of the aforementioned common electrodes COME and the detection electrodes DETE. In the liquid crystal display device of this embodiment, a touch driver TPIC and a display driver DDI cooperate with each other, whereby a drive pulse Tx is input to the common electrode COME, and a detection pulse Rx is obtained from the detection electrode DETE. The display driver DDI outputs a drive pulse Tx, and the touch driver TPIC grasps a contact position of the finger from a position of the common electrodes COME at which the drive pulse Tx has been input, and a waveform of the detection pulse Rx. Here, it is possible to contrive the configuration in such a manner that calculation of the touch position is carried out by an external device not shown. FIG. 6A and FIG. 6B are views for explaining a driving method of the mutual-detection scheme of the liquid crystal display device of this embodiment.

In FIG. 6A, drive unit electrodes Tu of the common electrode COME are shown. Each of the drive unit electrodes Tu1, . . . TuN includes a plurality of consecutive stripe-like common electrodes Come. As described above, the common electrodes COME used for image display are also used as drive electrodes for touch position detection, and hence an image display operation and a touch position detection operation are executed on the basis of timesharing.

In the drive scheme shown in FIG. 6B, one frame period includes a plurality of units. One unit is divided into a period for displaying an image and a period for detecting a touch position. The divided image display period and the divided touch position detection period are alternately repeated, whereby one frame period is constituted. That is, an operation of outputting an image signal (SIGn) for each color in accordance with a signal (SEL R/B/G) for selecting one of three colors of RBG is executed for each of a plurality of image display rows, and thereafter a mutual-detection operation of inputting a drive pulse Tx to each of the drive unit electrodes Tu (a plurality of stripe-like common electrodes Come) is executed. Further, the above-mentioned operation are repetitively executed in sequence for each of the plurality of divided image display rows and the plurality of drive unit electrodes Tu (Tu1, . . . , TuN).

Figure 7:
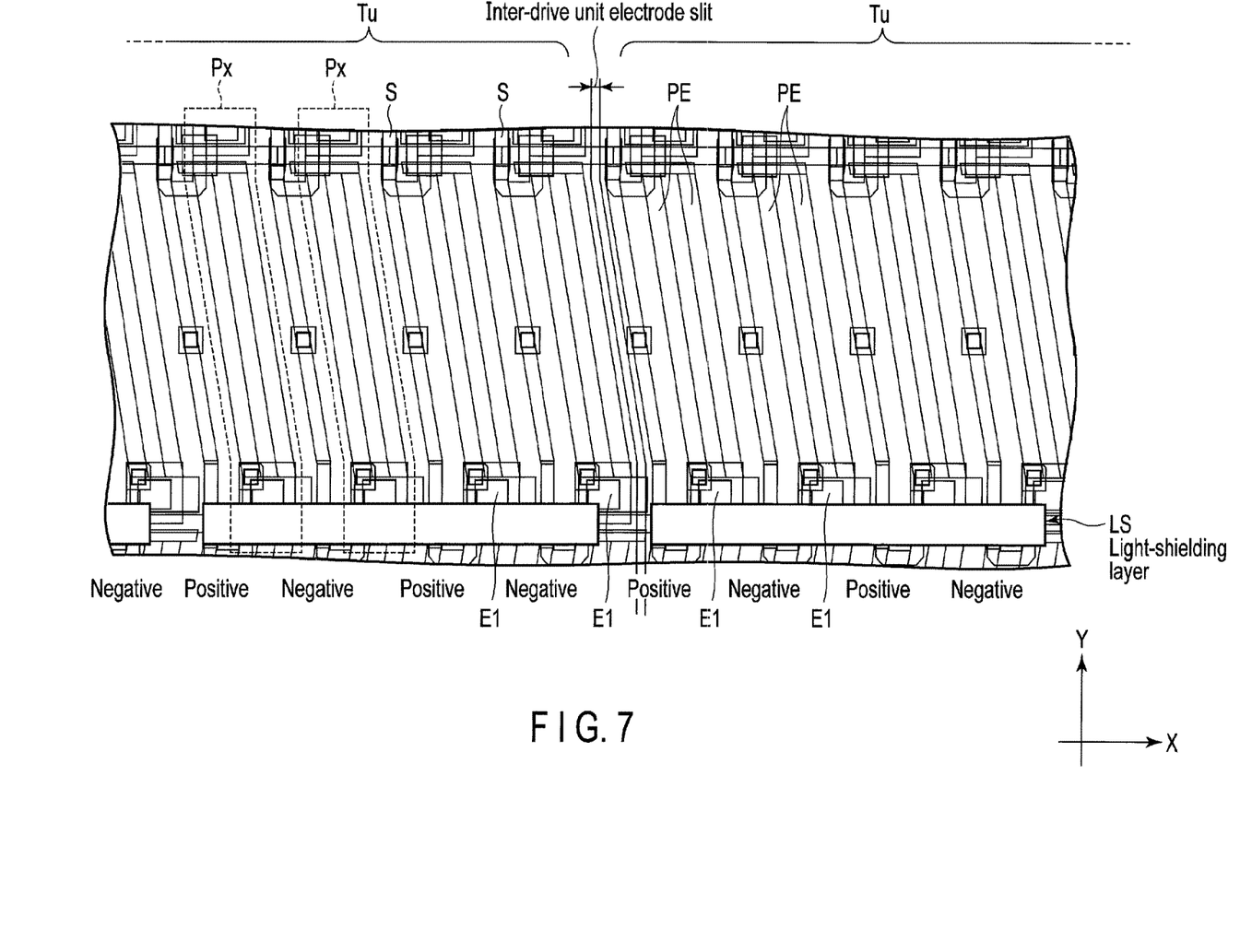
FIG. 7 is a plan view in an X-Y plane showing part of an active area when a liquid crystal display panel of the liquid crystal display device of the first embodiment is viewed from the counter-substrate side.

FIG. 7 is a plan view in an X-Y plane showing part of the active area ACT when the liquid crystal display panel LPN of the liquid crystal display device of the first embodiment is viewed from the counter-substrate side.

The pixel PX shown in FIG. 7 has a rectangular shape in which the length in the first direction X is shorter than the length in the second direction Y. Each of the pixels PX is provided with a slit-like pixel electrode PE and contact electrode E1. Between the respective pixels PX arranged in the first direction X, source lines S extend substantially linear in the second direction Y.

Here, in the thin-film transistor (TFT) to be used as a switching element SW, a leak current is generated by, for example, being irradiated with light such as light of the backlight. This phenomenon is called light leak, and particularly in a TFT using low-temperature polysilicon (LTPS), the phenomenon occurs even at room temperature. For this reason, the thin-film transistor (TFT) is provided with a light-shielding layer LS so that the thin-film transistor (TFT) is not irradiated with light.

The light-shielding layer LS is provided, in the plan view, in the first direction X for each of the drive unit electrodes Tu of the active area ACT and, in one drive unit electrode Tu, the light-shielding layer LS is arranged to extend from one end to the other end of the drive unit electrode Tu concerned. That is, the light-shielding layer LS is divided by a boundary area (inter-drive unit electrode slit) between two drive unit electrodes Tu adjacent to each other in the first direction X.

Incidentally, in the liquid crystal display device of this embodiment, a column-inversion drive scheme is employed with the object of providing a liquid crystal display device excellent in display quality. In the column-inversion drive scheme, the temporal positive/negative polarities to be applied to the source lines are distributed in such a manner that the polarity is alternately inverted for each column, whereby positive and negative differences between positive luminance responses and negative luminance responses macroscopically cancel out each other making it possible to make a flicker not visually confirmable. Further, in the liquid crystal display device of this embodiment, in the plan view, source lines S of the positive polarity and source lines S of the negative polarity included in one drive unit electrode Tu are provided in such a manner that the number of the positive polarity source lines S and the number of the negative polarity source lines S are equal to each other.

Figure 8:
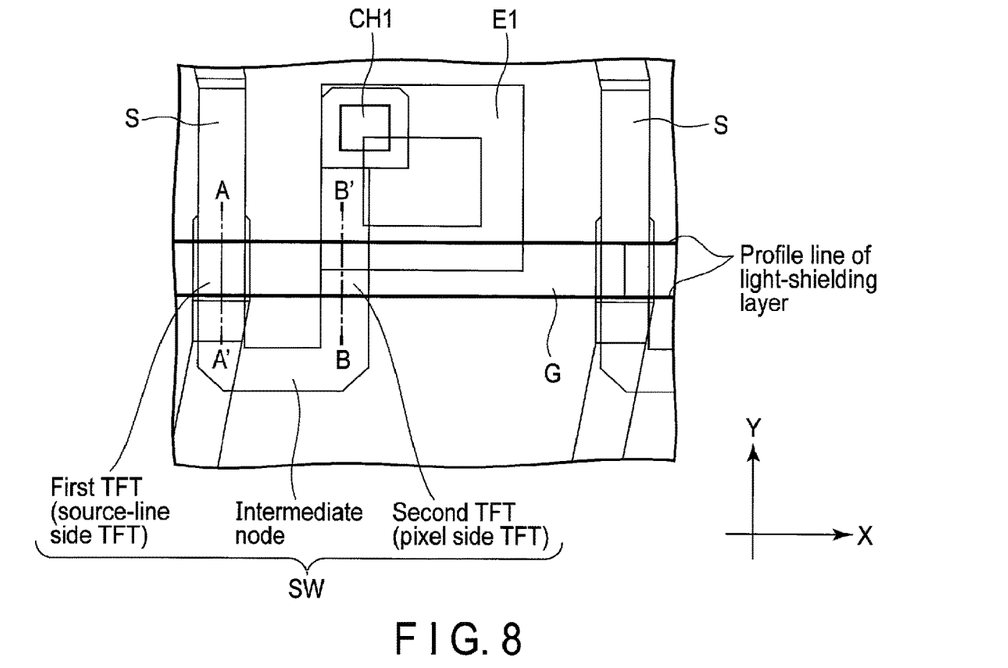
FIG. 8 is a plan view for explaining a position in which the light-shielding layer of the liquid crystal display device of the first embodiment is arranged.

FIG. 8 is a plan view for explaining a position in which the light-shielding layer LS of the liquid crystal display device of the first embodiment is arranged. In FIG. 8, a part shown in FIG. 7 at which the light-shielding layer LS and the switching element SW cross each other is shown in an enlarging manner.

In this embodiment, the switching element SW includes a thin-film transistor (TFT). As described previously, the switching element SW has a double-gate structure. Accordingly, the switching element SW is provided with two TFTs including a source-line side TFT (first TFT), and a pixel side TFT (second TFT). It should be noted that these TFTs are constituted of low-temperature polysilicon (LTPS).

A source terminal (not shown) of the source-line side TFT (first TFT) is connected to a source line S through a contact hole (not shown), a drain terminal (not shown) thereof is connected to a source terminal (not shown) of the pixel side TFT (second TFT) through an intermediate node (high concentration phosphorus-doped region HDD of the TFT to be described later). A drain terminal (not shown) of the pixel side TFT (second TFT) is connected to the contact electrode E1 through a contact hole CH1. Further, the contact electrode E1 is connected to a pixel electrode PE (not shown).

The light-shielding layer LS is present in the underlying layer of the gate line G, and extends in the first direction X substantially in parallel with the gate line G to overlap the gate line G.

Figure 9:
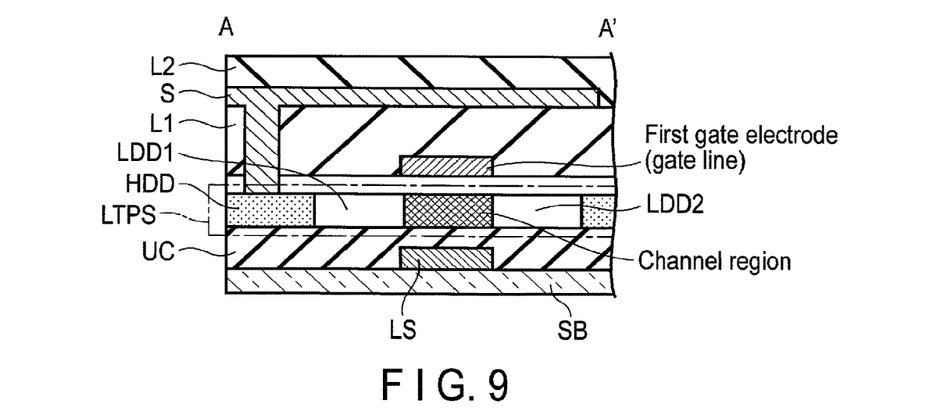
FIG. 9 is a view schematically showing the cross-sectional structure of the source-line side TFT (first TFT) shown in FIG. 8 of the liquid crystal display device of the first embodiment cut along line A-A'.

FIG. 9 is a view schematically showing the cross-sectional structure of the source-line side TFT (first TFT) shown in FIG. 8 of the liquid crystal display device of the first embodiment cut along line A-A'.

The light-shielding layer LS is arranged on a transparent insulating substrate SB, and is covered with an insulating film UC. On the insulating film UC, low-temperature polysilicon LTPS is provided, and a gate line G is arranged as a gate electrode (first gate electrode) of the source-line side TFT (first TFT) above the low-temperature polysilicon (LTPS). The gate electrode (first gate electrode) is covered with a first interlayer insulating film L1. On the first interlayer insulating film L1, a source line S is arranged, and is covered with a second interlayer insulating film L2. Further, the source line S is connected to the low-temperature polysilicon LTPS through a contact hole.

In the low-temperature polysilicon LTPS, a channel region is formed in a region overlapping the first gate electrode, and low concentration phosphorus-doped regions LDD1 and LDD2 are formed on both sides of the channel region. High concentration phosphorus-doped regions HDD are formed on both sides of the low concentration phosphorus-doped regions LDD1 and LDD2. The high concentration phosphorus-doped region HDD formed on the right side of FIG. 9 is connected to the pixel side TFT (second TFT) through the intermediate node.

In the source-line side TFT (first TFT), the light-shielding layer LS is provided in such a manner that the light-shielding layer LS covers the channel region, but does not cover the low concentration phosphorus-doped regions LDD1 and LDD2. That is, the light-shielding layer LS is provided in such a manner that the light-shielding layer LS shields the channel region from light, but does not shield the low concentration phosphorus-doped regions LDD1 and LDD2 from light.

Subsequently, an advantage provided by the liquid crystal display device of the above-mentioned embodiment will be described below.

In recent years, in a liquid crystal display device, the trend toward higher definition and higher aperture is further promoted, and hence the retention capacity of the individual pixel is gradually becoming smaller. Along with such a trend, the parasitic capacitance tends to increase owing to the proximity of the light-shielding layer LS and the source line S to each other. As a result, the potential of the light-shielding layer LS provided in an electrically-floating state is changed by the potential of the source line S, whereby the characteristics of the pixel side TFT are changed and the display quality is lowered.

As described above, in the liquid crystal display device of this embodiment, in the plan view, the light-shielding layer LS is provided by dividing it into parts each of which corresponds to each drive unit electrode Tu, and source lines S of the positive polarity and source lines S of the negative polarity included in one drive unit electrode Tu are provided in such a manner that the number of the positive polarity source lines S and the number of the negative polarity source lines S are equal to each other. Accordingly, by reducing the influence of the potential change of the source line S and by reducing the potential change of the light-shielding layer LS, it is possible to prevent the display quality from lowering. Further, as a result, it is possible to prevent the potential of the light-shielding layer LS from lowering the sensitivity of the touch detection sensor through the parasitic capacitance.

Second Embodiment

In a second embodiment, in the plan view, the combination of source lines S included in one drive unit electrode Tu differs from the first embodiment. Parts identical to the first embodiment are denoted by reference symbols identical to the first embodiment, and descriptions of their details are omitted.

Figure 10:
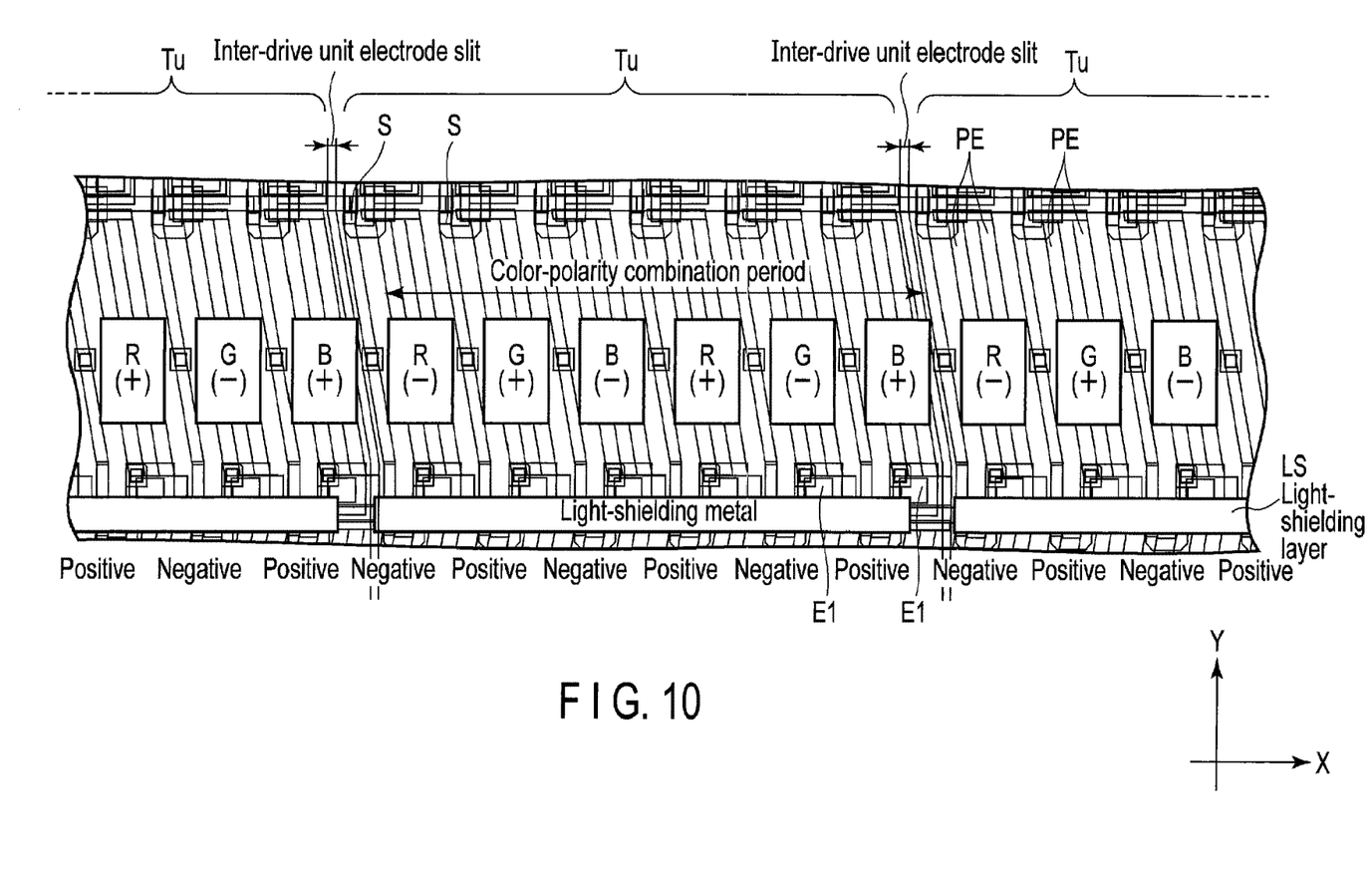
FIG. 10 is a plan view in an X-Y plane showing part of an active area when a liquid crystal display panel of a liquid crystal display device of a second embodiment is viewed from the counter-substrate side.

FIG. 10 is a plan view in an X-Y plane showing part of an active area ACT when a liquid crystal display panel LPN of a liquid crystal display device of the second embodiment is viewed from the counter-substrate side.

In the second embodiment, in the plan view, source lines S of the positive polarity and source lines S of the negative polarity included in one drive unit electrode Tu are provided in such a manner that the number of the positive polarity source lines S and the number of the negative polarity source lines S are equal to each other. Furthermore, in the liquid crystal display device of the color-display type, when a red-colored layer, green-colored layer, and blue-colored layer of the color filter CF are periodically arranged in the first direction X, the light-shielding layer LS is arranged to extend across at least six colored layers arranged in the first direction X. The light-shielding layer LS included in one drive unit electrode Tu is arranged to extend across a region opposed to a region of an even number of sets of a plurality of periodically arranged color layers.

Accordingly, in the plan view, the light-shielding layer LS is provided by dividing it into parts each of which corresponds to each drive unit electrode Tu and, furthermore a pair of source lines S of an identical color and of opposite polarities is included in one drive unit electrode Tu, and hence the influence of the potential change of the source line S is reduced and the potential change of the light-shielding layer LS is reduced, whereby it is possible to prevent the display quality from lowering. Further, as a result, it is possible to prevent the potential of the light-shielding layer LS from lowering the sensitivity of the touch detection sensor through the parasitic capacitance.

Third Embodiment

In a third embodiment, in the plan view, the shape of the light-shielding layer LS included in one drive unit electrode Tu differs from the first embodiment. Parts identical to the first embodiment are denoted by reference symbols identical to the first embodiment, and descriptions of their details are omitted.

Figure 11:
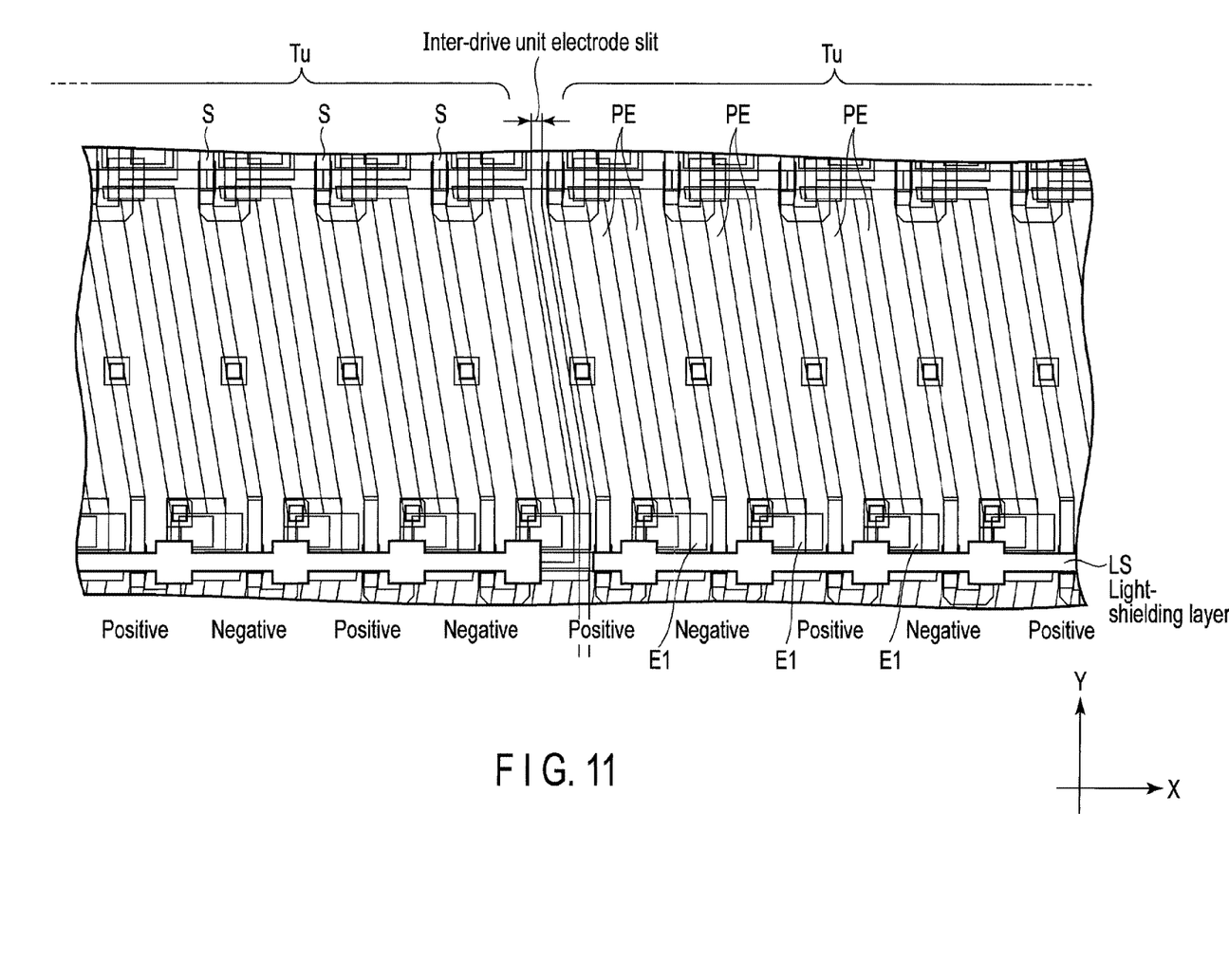
FIG. 11 is a plan view in an X-Y plane showing part of an active area when a liquid crystal display panel of a liquid crystal display device of a third embodiment is viewed from the counter-substrate side.

FIG. 11 is a plan view in an X-Y plane showing part of an active area ACT when a liquid crystal display panel LPN of a liquid crystal display device of the third embodiment is viewed from the counter-substrate side.

As shown in FIG. 11, in the third embodiment too, in the plan view, the light-shielding layer LS is provided for each drive unit electrode Tu of an active area ACT in the first direction X, and is arranged, in one drive unit electrode Tu, to extend from one end to the other end of the drive unit electrode Tu concerned. That is, the light-shielding layer LS is divided by a boundary area (inter-drive unit electrode slit) between two drive unit electrodes Tu adjacent to each other in the first direction X. Further, in the third embodiment, the width of the light-shielding layer LS in the second direction Y at each of parts at which the light-shielding layer LS crosses the contact electrodes E1 is made wider than the width of the light-shielding layer LS in the second direction Y at each of other parts.

Figure 12:
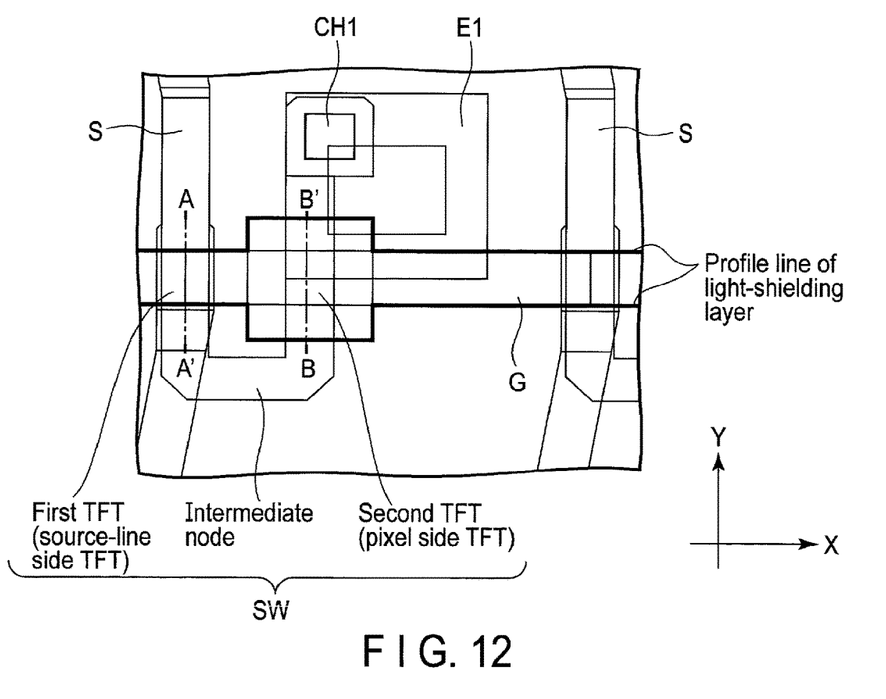
FIG. 12 is a plan view for explaining a position in which a light-shielding layer of the liquid crystal display device of the third embodiment is arranged.

FIG. 12 is a plan view for explaining a position in which the light-shielding layer LS of the liquid crystal display device of the third embodiment is arranged. In FIG. 12, a part shown in FIG. 11 at which the light-shielding layer LS and the switching element SW cross each other is shown in an enlarging manner.

As shown in FIG. 12, the light-shielding layer LS has a shape in which an area of a part at which the light-shielding layer LS crosses the pixel side TFT (second TFT) is larger than a part at which the light-shielding layer LS crosses the source-line side TFT (first TFT). In the third embodiment, by providing the light-shielding layer LS having such a shape, reduction in flicker in the low-frequency drive is realized.

Figure 13:
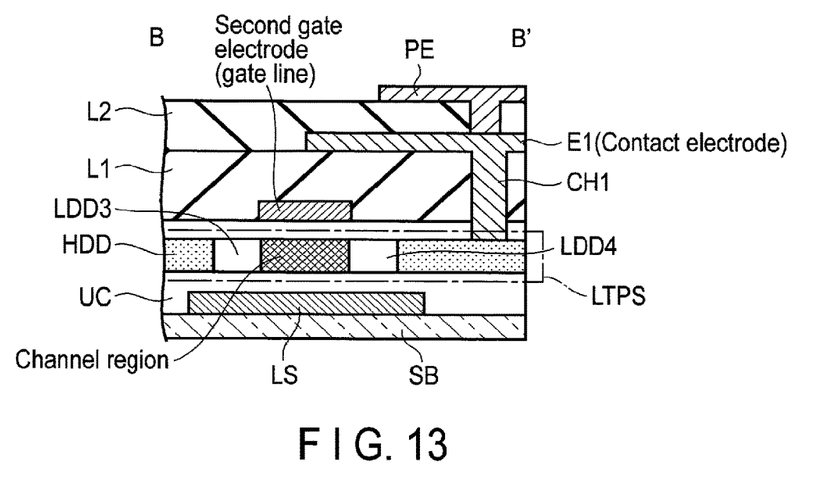
FIG. 13 is a view schematically showing the cross-sectional structure of the pixel side TFT (second TFT) shown in FIG. 12 of the liquid crystal display device of the third embodiment cut along line B-B'.

FIG. 13 is a view schematically showing the cross-sectional structure of the pixel side TFT (second TFT) shown in FIG. 12 of the liquid crystal display device of the third embodiment cut along line B-B'.

The light-shielding layer LS is arranged on a transparent insulating substrate SB, and is covered with an insulating film UC. On the insulating film UC, low-temperature polysilicon LTPS is provided, and above the low-temperature polysilicon, a gate line G is arranged as a gate electrode (second gate electrode) of the pixel side TFT (second TFT). The gate electrode (second gate electrode) is covered with a first interlayer insulating film L1. On the first interlayer insulating film L1, a contact electrode E1 is arranged, and is covered with a second interlayer insulating film L2. On the second interlayer insulating film L2, a pixel electrode PE is arranged. Further, the pixel electrode PE is connected to the contact electrode E1 through a contact hole CH1, and the contact electrode E1 is connected to the low-temperature polysilicon LTPS through a contact hole.

In the low-temperature polysilicon LTPS, a channel region is formed in a region overlapping the second gate electrode, and low concentration phosphorus-doped regions LDD3 and LDD4 are formed on both sides of the channel region. High concentration phosphorus-doped regions HDD are formed on both sides of the low concentration phosphorus-doped regions LDD3 and LDD4. The high concentration phosphorus-doped region HDD formed on the left side of FIG. 13 is connected to the source-line side TFT (first TFT) through an intermediate node.

In the pixel side TFT (second TFT), the light-shielding layer LS is provided to cover the channel region and the low concentration phosphorus-doped regions LDD3 and LDD4. That is, the light-shielding layer LS is provided to shield the channel region and the low concentration phosphorus-doped regions LDD3 and LDD4 from light.

It should be noted that the cross-sectional structure of the source-line side TFT (first TFT) shown in FIG. 12 cut along line A-A' is identical to the cross-sectional structure of the liquid crystal display device of the first embodiment shown in FIG. 9.

A reduction in flicker due to the light leak can be realized by providing a light-shielding layer LS of the shape shown in the third embodiment.

It should be noted that in the liquid crystal display device of the third embodiment, in the same manner as the first embodiment, in the plan view, the source lines S are provided in such a manner that the number of the source lines S of the positive polarity and the number of the source lines S of the negative polarity included in one drive unit electrode Tu are equal to each other. Furthermore, as in the case of the second embodiment, the light-shielding layer LS included in one drive unit electrode Tu may be arranged to extend across a region opposed to a region of periodically arranged colored layers of a plurality of types corresponding to an even number of periods.

Therefore, according to the liquid crystal display device of the third embodiment, it is possible to reduce the influence of the potential change of the source line S and thereby reduce the potential change of the light-shielding layer LS. Further, the light-shielding layer LS is provided by dividing it into parts each of which corresponds to each drive unit electrode Tu, whereby it is possible to prevent the potential of the light-shielding layer LS from lowering the sensitivity of the touch detection sensor through the parasitic capacitance. Furthermore, it is possible to realize a reduction in flicker due to the light leak.

It should be noted that the shape of the light-shielding layer LS of the third embodiment is not limited to the aspect shown in FIG. 12, and various shape variations described below can be taken.

Figure 14:
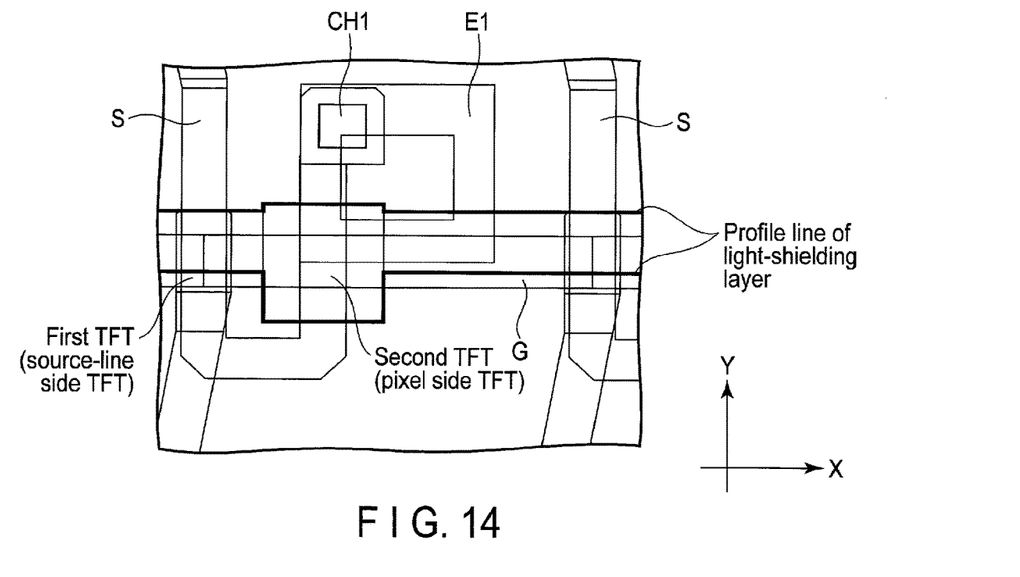
FIG. 14 is a plan view for explaining a position in which a light-shielding layer of a liquid crystal display device of a variation of the third embodiment is arranged.

FIG. 14 is a plan view for explaining a position in which a light-shielding layer of a liquid crystal display device of a variation of the third embodiment is arranged. In FIG. 14, a part at which the light-shielding layer LS and the switching element SW cross each other is shown in an enlarging manner.

Although the area (size) and arrangement of the part of the light-shielding layer LS at which the light-shielding layer LS crosses the pixel side TFT (second TFT) are identical to the third embodiment, the parts of the light-shielding layer LS other than the part at which the light-shielding layer LS crosses the pixel side TFT are shifted to positions in a direction in which the parts are made closer to the pixel electrode PE (upward direction in FIG. 14), and off from the gate line G. Further, in the variation embodiment, the light-shielding layer LS is provided to cover the channel region and the low concentration phosphorus-doped regions of the pixel side TFT (second TFT), and is provided to cover part of the channel region of the source-line side TFT (first TFT).

Figure 15:
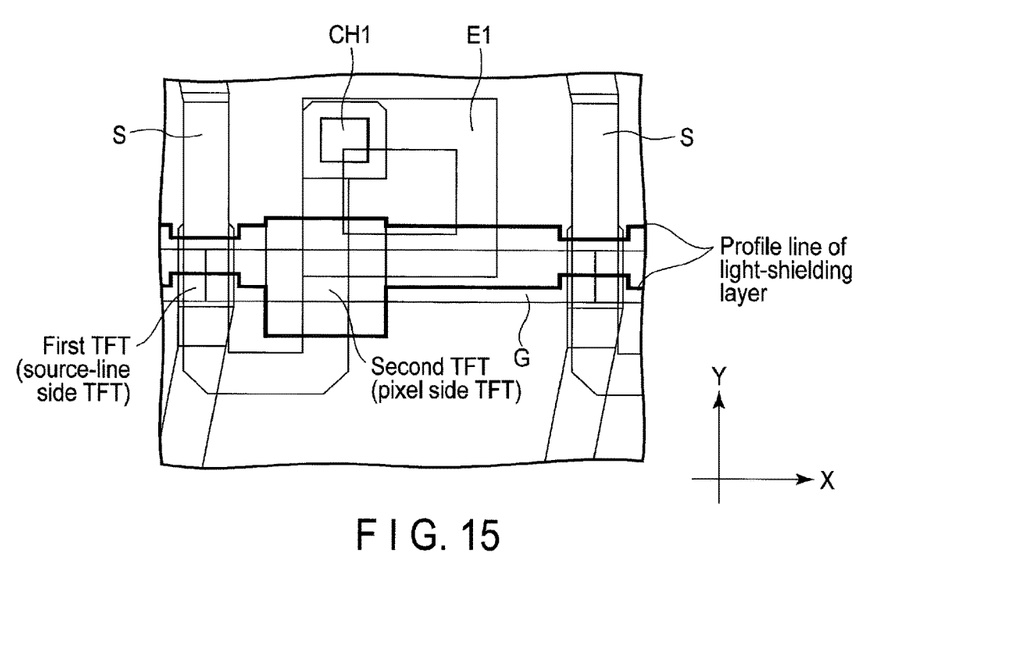
FIG. 15 is a plan view for explaining a position in which a light-shielding layer of a liquid crystal display device of another variation of the third embodiment is arranged.

FIG. 15 is a plan view for explaining a position in which a light-shielding layer of a liquid crystal display device of another variation of the third embodiment is arranged. In FIG. 15, a part at which the light-shielding layer LS and the switching element SW cross each other is shown in an enlarging manner.

Although the area (size) and arrangement of the part of the light-shielding layer LS at which the light-shielding layer LS crosses the pixel side TFT (second TFT) are identical to the third embodiment, the parts of the light-shielding layer LS other than the part at which the light-shielding layer LS crosses the pixel side TFT are shifted to positions in a direction in which the parts are made closer to the pixel electrode PE (upward direction in FIG. 14), and off from the gate line G. Further, the width of the light-shielding layer LS at each of parts at which the light-shielding layer LS crosses the source-line side TFT (first TFT) is made narrower than the third embodiment. Further, in another variation concerned, the light-shielding layer LS is provided to cover the channel region and the low concentration phosphorus-doped regions of the pixel side TFT (second TFT), and is provided to cover part of the channel region of the source-line side TFT (first TFT).

In these variation embodiments too, a reduction in flicker due to the light leak can be realized, and an advantage identical to the third embodiment can be obtained.

It should be noted that in the variation embodiments described above, although the light-shielding layer LS is shifted in a direction in which the light-shielding layer LS is made closer to the pixel electrode PE (upward direction in FIG. 14 and FIG. 15), and off from the gate line G, the light-shielding layer LS may not be shifted, and the light-shielding layer LS may be arranged to overlap the gate line G in the same manner as the third embodiment, and further the width of the light-shielding layer LS at each of parts at which the light-shielding layer LS crosses the source-line side TFT (first TFT) may be made narrower than the first embodiment.

It should be noted that the present invention is not limited to the panel structure described in the embodiments.

In the embodiments, although a panel using the liquid crystal of the lateral electric field scheme such as In-Plane Switching (IPS) mode, Fringe-Field Switching (FFS) mode, and the like has been made an example, the panel structure is not limited to the above embodiments, and a panel using the liquid crystal of the longitudinal electric field scheme such as Twisted Nematic (TN) mode, Optically Compensated Bend (OCB) mode, and the like can also be employed.

Based on the display device which has been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    touch-sensor electrodes configured to include a plurality of electrodes;
    an array substrate configured to include pixel electrodes arranged in a matrix form, gate lines extending along rows in which the pixel electrodes are arranged, source lines extending along columns in which the pixel electrodes are arranged, switching elements arranged in vicinities of positions at which the gate lines and the source lines cross each other, a light-shielding layer arranged in an underlying layer of the switching elements and extending in a direction identical to the direction in which the gate lines extend, and a plurality of stripe-like common electrodes extending in a direction identical to the direction in which the source lines extend;
    a counter-substrate; and
    a liquid crystal layer held between the array substrate and the counter-substrate, wherein
    the common electrodes included in the array substrate are used not only as electrodes for display, but also as touch-sensor electrodes and, in a touch operation, a touch drive signal is input to each drive unit electrode including a plurality of common electrodes,
    the light-shielding layer is divided into parts each of which corresponds to the drive unit electrode, and is provided to extend across a region opposed to a region of the drive unit electrode,
    the switching element possesses a double-gate structure including a first TFT provided on the source line side, and a second TFT provided on the pixel electrode side, and
    an area of a part of the light-shielding layer at which the light-shielding layer crosses the first TFT is smaller than an area of a part thereof at which the light-shielding layer crosses the second TFT.

2. The liquid crystal display device according to claim 1, wherein
    the light-shielding layer is
    provided to cover, in an underlying layer of the first TFT, a channel region and low concentration phosphorus-doped regions of the first TFT, and is
    provided to cover, in an underlying layer of the second TFT, a channel region of the second TFT.

3. The liquid crystal display device according to claim 1, wherein
    the light-shielding layer is
    provided to cover, in an underlying layer of the first TFT, a channel region and low concentration phosphorus-doped regions of the first TFT, and is
    provided to cover, in an underlying layer of the second TFT, part of a channel region of the second TFT.

4. The liquid crystal display device according to claim 1, wherein
    signals of polarities different from each other are applied to the source lines adjacent to each other, and
    the polarities of the signals applied to the source lines are inverted for each frame.

5. A liquid crystal display device comprising:
    touch-sensor electrodes configured to include a plurality of electrodes;
    an array substrate configured to include pixel electrodes arranged in a matrix form, gate lines extending along rows in which the pixel electrodes are arranged, source lines extending along columns in which the pixel electrodes are arranged, switching elements arranged in vicinities of positions at which the gate lines and the source lines cross each other, a light-shielding layer arranged in an underlying layer of the switching elements and extending in a direction identical to the direction in which the gate lines extend, and a plurality of stripe-like common electrodes extending in a direction identical to the direction in which the source lines extend;
    a counter-substrate; and
    a liquid crystal layer held between the array substrate and the counter-substrate, wherein
    the common electrodes included in the array substrate are used not only as electrodes for display, but also as touch-sensor electrodes and, in a touch operation, a touch drive signal is input to each drive unit electrode including a plurality of common electrodes,
    the light-shielding layer is divided into parts each of which corresponds to the drive unit electrode, and is provided to extend across a region opposed to a region of the drive unit electrode,
    each of the divided parts of the light-shielding layer crosses the source lines of an even number,
    the source lines include first source lines to which a signal of a positive polarity is applied during a predetermined horizontal period of each frame, and second source lines to which a signal of a negative polarity is applied,
    each of the source lines of the even number includes the first source lines and the second source lines of an identical number,
    the switching element possesses a double-gate structure including a first TFT provided on the source line side, and a second TFT provided on the pixel electrode side, and
    an area of a part of the light-shielding layer at which the light-shielding layer crosses the first TFT is smaller than an area of a part thereof at which the light-shielding layer crosses the second TFT.

6. The liquid crystal display device according to claim 5, wherein
    the light-shielding layer is provided to cover, in an underlying layer of the first TFT, a channel region and low concentration phosphorus-doped regions of the first TFT, and is provided to cover, in an underlying layer of the second TFT, a channel region of the second TFT.

7. The liquid crystal display device according to claim 5, wherein the light-shielding layer is provided to cover, in an underlying layer of the first TFT, a channel region and low concentration phosphorus-doped regions of the first TFT, and is provided to cover, in an underlying layer of the second TFT, part of a channel region of the second TFT.

8. A liquid crystal display device comprising:

touch-sensor electrodes configured to include a plurality of electrodes;

an array substrate configured to include pixel electrodes arranged in a matrix form, gate lines extending along rows in which the pixel electrodes are arranged, source lines extending along columns in which the pixel electrodes are arranged, switching elements arranged in vicinities of positions at which the gate lines and the source lines cross each other, a light-shielding layer arranged in an underlying layer of the switching elements and extending in a direction identical to the direction in which the gate lines extend, and a plurality of stripe-like common electrodes extending in a direction identical to the direction in which the source lines extend;

a counter-substrate; and a liquid crystal layer held between the array substrate and the counter-substrate, wherein the common electrodes included in the array substrate are used not only as electrodes for display, but also as touch-sensor electrodes and, in a touch operation, a touch drive signal is input to each drive unit electrode including a plurality of common electrodes, the light-shielding layer is divided into parts each of which corresponds to the drive unit electrode, and is provided to extend across a region opposed to a region of the drive unit electrode, each of the divided parts of the light-shielding layer crosses the source lines of an even number, the source lines include first source lines to which a signal of a positive polarity is applied during a predetermined horizontal period of each frame, and second source lines to which a signal of a negative polarity is applied, each of the source lines of the even number includes the first source lines and the second source lines of an identical number, the counter-substrate includes a color filter including a plurality of types of colored layers, and each of the divided parts of the light-shielding layer is provided to extend across a region opposed to a region of an even number of sets of a plurality of periodically arranged color layers, the switching element possesses a double-gate structure including a first TFT provided on the source line side, and a second TFT provided on the pixel electrode side, and an area of a part of the light-shielding layer at which the light-shielding layer crosses the first TFT is smaller than an area of a part thereof at which the light-shielding layer crosses the second ITT.

9. The liquid crystal display device according to claim 8, wherein the light-shielding layer is provided to cover, in an underlying layer of the first TFT, a channel region and low concentration phosphorus-doped regions of the first TFT, and is provided to cover, in an underlying layer of the second TFT, a channel region of the second TFT.

10. The liquid crystal display device according to claim 8, wherein the light-shielding layer is provided to cover, in an underlying layer of the first TFT, a channel region and low concentration phosphorus-doped regions of the first TFT, and is provided to cover, in an underlying layer of the second TFT, part of a channel region of the second TFT.

* * * * *